United States Patent [19]

Oestreich

[11] Patent Number: 4,997,258
[45] Date of Patent: Mar. 5, 1991

[54] METHOD AND APPARATUS FOR MANUFACTURING AN OPTICAL CABLE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 413,866

[22] Filed: Sep. 28, 1989

[30] Foreign Application Priority Data

Oct. 7, 1988 [DE] Fed. Rep. of Germany ....... 3834219
Feb. 3, 1989 [DE] Fed. Rep. of Germany ....... 3903283

[51] Int. Cl.$^5$ .............................................. G02B 6/44
[52] U.S. Cl. ...................................... 350/96.23; 57/7; 264/1.5
[58] Field of Search ................. 350/96.23; 57/7, 293; 264/1.5

[56] References Cited

U.S. PATENT DOCUMENTS

| 3,187,495 | 6/1965 | Christian | 57/293 |
| 4,017,579 | 4/1977 | Roe et al. | 57/7 X |
| 4,056,925 | 11/1977 | Vogelsberg | 57/293 |
| 4,366,667 | 1/1983 | Oestreich | 57/7 |
| 4,458,476 | 7/1984 | Mayr et al. | 57/7 |
| 4,577,403 | 3/1986 | Garner | 57/7 |

FOREIGN PATENT DOCUMENTS 0171841 of 1986 European Pat. Off. .
2326742 12/1974 Fed. Rep. of Germany ........... 57/7
2922986 of 1979 Fed. Rep. of Germany .

OTHER PUBLICATIONS

G. Le Noane "Optical Fibre Cables" Telecommunication Journal, vol. 48, XI/1981, pp. 649-656.

Primary Examiner—John D. Lee
Assistant Examiner—Phan T. Heartney
Attorney, Agent, or Firm—Hill, Van Santen, Steadman & Simpson

[57] ABSTRACT

A method and apparatus for forming a cable which has a supporting member that is provided by an extruder with helically extending grooves or chambers that proceed in changing directions for the acceptance of light waveguides characterized by synchronously rotating the cable elements proceeding an extruder for applying the supporting member and also following the insertion point for the light waveguides. The light waveguides are inserted at a position which is an even-numbered multiple of the distance between reversing points of the chambers of the supporting members from the output of the extruder so that the direction of the chambers at the extruder and at the insertion point, respectively, proceed in the same direction.

17 Claims, 2 Drawing Sheets

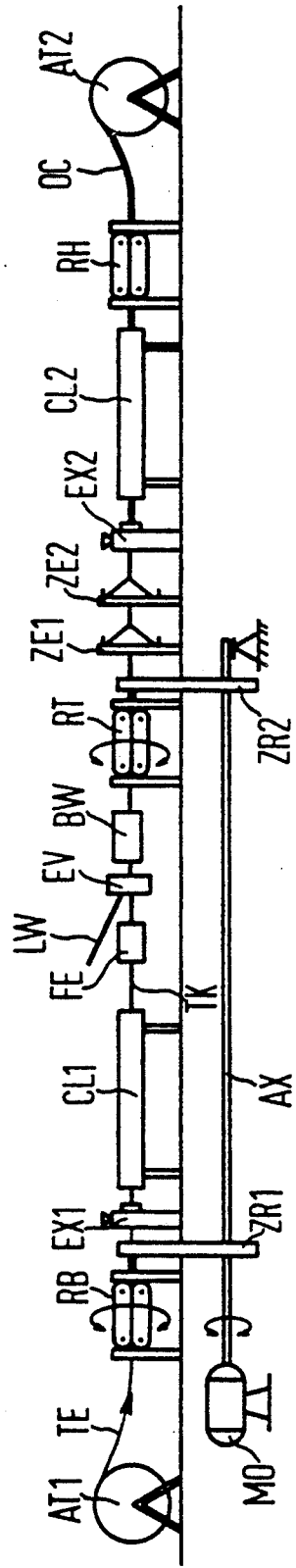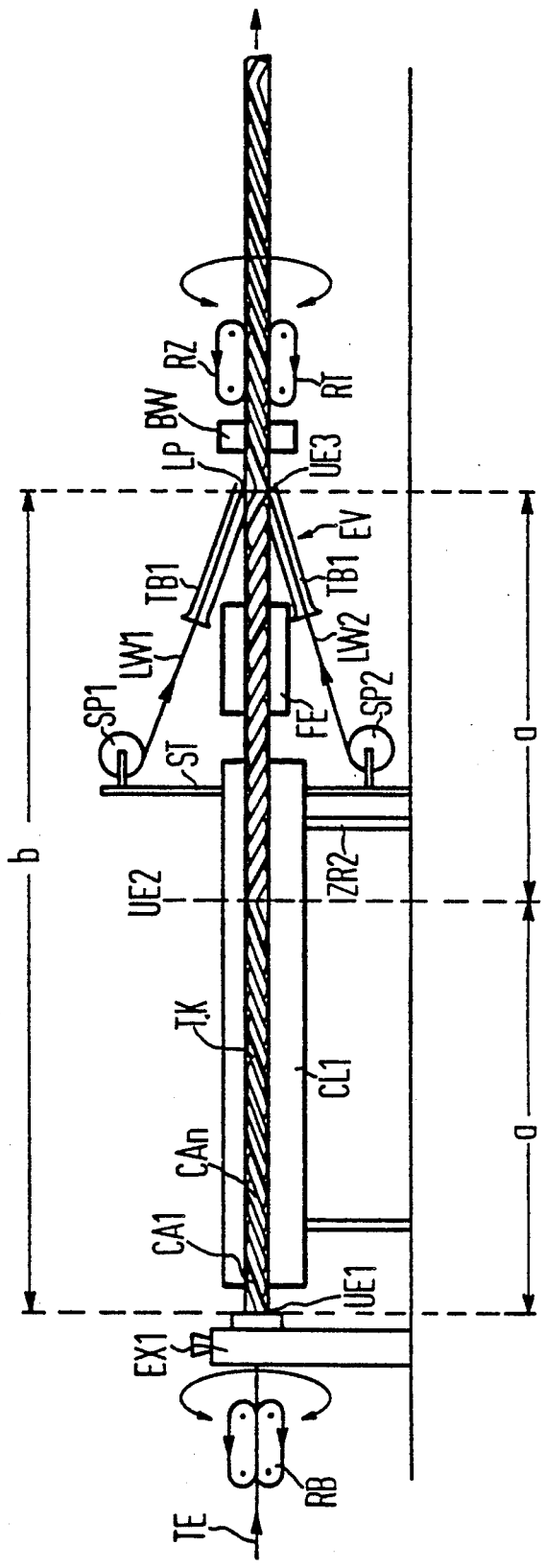

METHOD AND APPARATUS FOR MANUFACTURING AN OPTICAL CABLE

BACKGROUND OF THE INVENTION

The present invention is directed to a method for manufacturing an optical cable, wherein a supporting member is produced with an extruder and is thereby provided with chambers or grooves that helically proceed in alternate directions with a defined spacing between reversing points and whereby light waveguides are subsequently placed in these chambers or grooves at an insertion point.

German OS No. 29 22 986 discloses an arrangement wherein helically proceeding chambers or grooves are provided on a supporting member and can have a changing running direction so that they have a defined spacing between reversing points, similar to the known SZ-stranding. In detail, one thereby proceeds so that a fixed extruder unit is provided that is followed by a twisting unit at a definite distance following an intermediate cooling station. This twisting unit has the job of exerting a torsion on the finished supporting member that is already provided with the chambers and exerting this torsion so that the effect of the torsion extends backward up to the extruder head of the extruder unit and causes an oscillating motion there of the tension element passing through the extruder head. The chambers, which helically proceed in different directions in alteration, are produced in this fashion. The twisting unit is followed by an insertion unit that works with two oscillating insertion disks for the light waveguides. In addition to the outlay for the insertion disks, a disadvantage of this arrangement is that a control and guide means is required in order to guarantee the synchronization of the insertion disks. The cause of this lies in the fact that the rotational angle of the central element becomes smaller and smaller proceeding from the rotational unit with increasing distance, so that it is not possible to couple chamber manufacture and element insertion.

European application Ser. No. EP-A1 0 171 841 discloses a manufacturing method for a chambered cable, wherein the twisting of the tensile element is undertaken before the extruder so that the torsion motion forced in this way is still also noticeable at the actual extruder head. Since the twisting occurs in a periodically changing direction, helical chambers respectively proceed in different directions in the alteration that occurs at the output of the extruder head. Here, too, the element turning decreases from the turning means up to the insertion mechanism so that the latter must be independently controlled. The insertion event is carried out so that a rotating insertion mechanism is provided and the output of this mechanism comprising guide tubes for the introduction of the light waveguides into the chamber of the supporting member. Here, too, the rotation of the insertion mechanism must follow the course of the chambers, for example corresponding controls and guide devices must be provided.

SUMMARY OF THE INVENTION

The object of the present invention is to implement the insertion of light waveguides into chambers or grooves in an optimally simple and reliable fashion.

To accomplish this goal, the present invention is directed to an improvement in a method for manufacturing optical cables wherein a support member is extruded on a tensile member and is provided with chambers or grooves proceeding helically in an alternating direction with a definite spacing between reversing points and whereby the method includes inserting light waveguides subsequently into these chambers at an insertion point. The improvements are synchronously rotating around the longitudinal axis, both proceeding the extruder as well as following the extruder, and that the light waveguides are inserted where the supporting member has approximately covered an even-numbered multiple of spacings between the reversal points, as calculated from the output of the extruder up to the insertion point of the light waveguides so that the direction of the chambers in the extruder and at the insertion point, respectively, proceed in the same direction and, thus, proceed synchronously.

In this way, the insertion event for the light waveguides is organized synchronously with the manufacture of the helical chambers or grooves, for example the directional reversal at the extruder and at the insertion point, respectively, occur at the same time. Rotating insertion disks and the appertaining controls and guide devices are, thus, eliminated because a resting position of the insertion mechanism is possible solely on the basis of space selection and on the basis of the synchronous rotation of the two twisters. It is merely required to set the insertion channels to the directional course of the chambers.

The chambers with reversing points generated, given simultaneous progressive haul-off of the elements, are expediently cooled and filled with the light waveguides, potentially after removal of the residual moisture, for example a liquid coolant. The longitudinal transport can occur either on the basis of the haul-off at a greater distance that does not participate in the rotation or can occur on the basis of the twisters themselves when these are quickly reversible tread-like pullers.

The application of a plurality of stationary or co-rotating twisters makes it possible to limit the torsion of the central element before the first twister and/or of the completely filled chamber element following the second twister at defined parts of the line.

The invention is also directed to an apparatus for the implementation of the improved method of the invention. This apparatus is characterized in that a first twister is provided before the extruder and a second twister is provided following the insertion point and in that the distance between the extruder and the insertion point for the light waveguides is selected to equal an even-numbered multiple of the spacing between the reversing points of the chambers or grooves in the supporting member.

Other advantages and features of the invention will be readily apparent from the following description of the preferred embodiments, the drawings and claims.

BRIEF DESCRIPTION OF THE DRAWINGS

FIG. 1 is a schematic presentation of the overall arrangement of the apparatus for implementing the method of the present invention;

FIG. 2 is an enlarged schematic view of a portion of the apparatus of FIG. 1;

DESCRIPTION OF THE PREFERRED EMBODIMENTS

Figure 3:
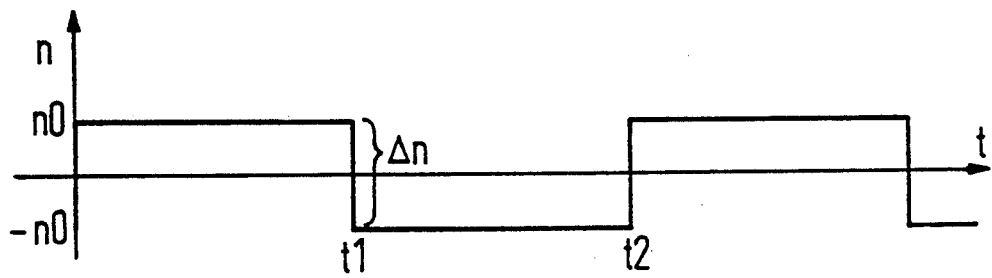
FIG. 3 is a graphical presentation of the speed of rotation vs. time.

The principles of the present invention are particularly useful when incorporated in the arrangement illustrated in FIG. 1 for performing the method of the invention. The arrangement of FIG. 1 includes a take-down drum ATI, which is rotatably seated in a longitudinal direction and is provided with a stationary shaft. A core element or member TE, which is preferably constructed of steel wire or of a high-strength plastic, for example an aramide yarn, is provided on the drum ATI and is supplied to a haul-off unit that will put a longitudinal movement or pull and is composed of a driven double belt track arrangement RB which has two bands rotating in opposite directions, between which the tensile element TE is transported. Wheels or similar devices, however, can also be used for this haul-off device.

The haul-off unit RB is followed by an extruder EX1, with which a plastic envelope is applied on the tensile element TE and this plastic envelope is provided with helically extending chambers or grooves that serve for the acceptance of the light waveguides. The plastic material of the envelope, when applied on the tensile element TE, form a supporting member TK which is then passed through a cooling device CLI which can be followed by a filling means FE that has the purpose of entirely or partially providing each of the chambers or grooves of the supporting member TK with a soft filler compound into which the light waveguides are later embedded. This filling material also has the job of protecting the light waveguides against unnecessary tensile stresses and of simultaneously guaranteeing the longitudinal water tightness of the cable. Subsequently, at least one light waveguide LW is introduced into every charged chamber of the supporting member TK with an insertion mechanism EV, whereby a light waveguide ribbon or stack of light waveguides can also be inserted instead of an individual light waveguide. The outwardly opened chambers of the supporting member TK are subsequently closed with a strip winding machine BW, with which a band is wound around the outside of the supporting member in a one-ply or multiple-ply fashion, potentially in the reversed lay as well. The strip winding machine can also be replaced by an extruder that applies a closing sheath. A further traction means is provided following this winding and, as illustrated, is in the form of a driven, double traction belt puller RT.

Following the second or further traction means RT is a winding means ZE1 which winds a tensile element onto the outside of the supporting member TK. In the present example, a second such winding means is also provided and is referenced ZE2, whereby this operates in the reverse lay relative to the first winding means ZE1 After the second winding means ZE2, a jacket extruder EX2 is provided for the application of an outside cladding or sheath, and this is followed by a further cooling path or device CL2, at whose output a further haul-off means, likewise fashioned in the form of a double belt traction device RH, is arranged. The finished optical cable OC obtained in this manner is wound onto a take-up drum AT2 that is rotatably seated but is spatially stationary.

If it is desired that the chambers or grooves in the supporting member TK respectfully proceed helically, but in alternating running directions, then particular measures must be undertaken in order to assure this. In the present exemplary embodiment, one, thus, proceeds such in detail that the two haul-off devices RB and RT rotate synchronously and with alternating rotational senses around their longitudinal axis. A motor MO, for example, can be provided for this purpose. This motor has a drive shaft AX which, for example, has toothed belts ZR1 extending to the first haul-off device RB and a second belt ZR2 that extends to the second haul-off device RT. Thus, both haul-off devices RB and RT rotate in the same direction at the same time. A plurality of revolutions, preferably at least two and up to eight revolutions around the longitudinal axis of the cable are thereby expediently carried out before a change in direction occurs. The twisting is subsequently undertaken with the same plurality of revolutions in the opposite direction. The twisters can also be individually driven, whereby the synchronism of the movement must remain assured. The tensile element TE is held by the first haul-off device RB and the supporting member TK is held by the second haul-off device RT, namely under certain tensile stresses so that a straight line passage through the extruder EX1 will occur. As a consequence of the synchronous rotation of the two twisters RB and RT, both the tensile elements TE, as well as the supporting member TK, are torsion-free in the region from the output of the first haul-off device or twister RB up to the input of the second haul-off device or twister RT. Thus, the plastic material is extruded on and the formation of the chambers or grooves occurs without a torsional stress appearing in the region of the extruder head of the extruder EX1. The insertion of the light waveguides LW, likewise, occurs in the region where no torsional stresses are present. On the other hand, a torsion of the tensile element TE is produced in the region between the take-down drum AT1 and the first haul-off device RB, due to the alternating rotation of the twister RB. Given corresponding lengths of the tensile element TE, this torsion is not critical in this region, whereby it must also be noted that the sum torsion mutually cancels because of the periodic changing in the rotational sense or direction of rotation so that no unstable oscillations occur with respect thereto. By increasing a distance between the take-down drum AT1 and the twister RB or by applying a further preceding, synchronous haul-off and/or, respectively, twister (not shown), a potential reaction can be eliminated at any time.

A periodically changing torsion that, however, is likewise compensated as a sum and does not oscillate unstably, likewise occurs in the region following the output of the second haul-off means RT up to the point where the take-up drum AT2 is reached. However, in order to be sure that the remainder of these alternating torsional events do not also proceed onto the take-up drum AT2, the third haul-off arrangement RH is provided and is constructed such that it does not allow potential torsional stresses to proceed up to the take-up drum AT2. For example the haul-off device RH, which serves as the final auxiliary haul-off, is arranged stationarily and does not rotate around the longitudinal cable axis. It also is fashioned of such a length that torsions that are exerted on the optical cable OC by the alternating rotation of the haul-off or twister RT cannot proceed up to the output of the haul-off RH. Here, too, every rotation decreases with increasing distance of the take-up drum AT2.

In the present example, the elements RB and RT have a double function. For example, they work both as haul-off means as well as twisters. The haul-off function of these elements can potentially be entirely or partially eliminated or can be undertaken by other elements. What must remain, by contrast, is the function as a twister, i.e., at least one respective isodirectional and synchronous twisting of the tensile element TE or, respectively, of the core element TK, must occur proceeding the extruder EX1 and following the insertion point in the region of the introduction means EV for the light waveguides LW.

FIG. 2 shows details of the apparatus of FIG. 1 and is directed to the region between the twister RB and the twister RT. As illustrated, the supporting member TK has a series of chambers or grooves CA1-CAn that proceed helically and, respectively, parallel to one another. The groove or chamber CA1 is shown in thicker lines for clarity. It is assumed in the present example that the reversal of the rotational sense occurs after, respectively, $3\frac{1}{2}$ full helical wrappings or turns of the supporting member by the chambers or grooves CA1-CAn. Corresponding to the illustration in FIG. 2, the first reversal point UE1 is precisely present at the region of the extruder head of the extruder EX1, whereas the second reversal point UE2 follows $3\frac{1}{2}$ lays or turns behind this and the third reversal point UE3 may be found after another $3\frac{1}{2}$ lays. As may be seen from the drawings, the same course in the direction of the chamber CA1 in the region of the extruder EX1 appears in the region of the insertion point LP. Expressed in general terms, the same course is always respectively established when the insertion point LP lies at a distance of an even-numbered multiple of the spacing a between two adjacent reversing points and, for example, corresponding to the distance b which is defined by the equation: $b=2ka$, wherein $k=1, 2, 3 \ldots$ and is a whole number.

The insertion event for the light waveguides can be easily implemented and can only be easily implemented when the directionally same course of the chambers CA1-CAn also appear at the extruder EX1 and at the insertion point LP for the light waveguides. For example, when the distance of the insertion point LP of the light waveguides is selected so that this amounts to an even-numbered multiple of distance a between the reversing points.

The present example shows how two light waveguides LW1 and LW2 are taken down from corresponding supply reels SP1 and SP2, which supply reels are stationarily arranged on a stand ST. This arrangement is especially advantageous in the manufacture of long cable lengths because the manufacturing process, then, needs not be separately interrupted for the connection of new cable reels. The light waveguides LW1 and LW2 enter into guide tubes TB1 and TB2, whereas these are mounted to pivot transversely relative to the longitudinal axis. The guide tubes TB1 and TB2 are dimensioned so that their guide noses fit precisely into the respective chambers or grooves CA1-CAn and are guided by the latter, whereby the guide function is limited to the adjustment or change of direction of the grooves or the chambers. This can occur in that the ends of the guide tubes TB1 and TB2 lie against the chamber walls or against the walls of the respective chambers. This simple pivoting transversely relative to a longitudinal axis of the guide tubes TB1 and TB2 assures that the respective guide tube can tangentially adapt to the course of the appertaining chamber or groove. A separate guide tube, whose openings all lie in the same plane proceeding transversely relative to the longitudinal cable axis, is provided for each of the chambers CA1-CAn. An introduction means EV for the light waveguides LW1 and LW2 is, thus, fashioned stationarily overall and merely the easy pivotability of the guide tubes TB1 and TB2 transversely relative to the longitudinal axis suffices for the purpose of the tangential introduction for inputting the light waveguides in the insertion region LP.

As in any twisting of the longer article, the twisting event is influenced by a counter-movement increasing with increasing rotational angle. The rotational angle per length unit therefore strives from the highest value following a reversing point roughly following an exponential function to the ultimate angle of 0. This latter can only be avoided in that the rotational sense is changed at the right time. Nonetheless, a certain variation of the length of the lay remains in this case and this fact is not impeding the insertion event for the light waveguides, but being potentially viewed as undesirable for the utilization of the product given very strict demands.

In FIG. 3, the speed n dependent on the time t is shown and shall first be referenced for explaining the conditions. The twisters, accordingly, are operated with a constant speed $n0$ and $-n0$ so that the speed discontinuity $\Delta n=2n0$ will appear in the region of the reversing points.

Figure 4:
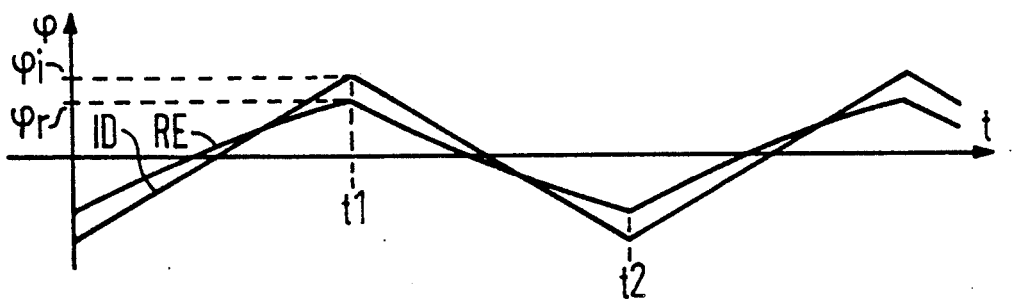
FIG. 4 is a graphical presentation of the rotational angle with regard to time.

FIG. 4 shows a rotational angle $\phi$ dependent on the time t. The rotational angle $\phi$ is affected by the influence of the twister on the cable. A curve that proceeds approximately saw-toothed thereby occurs qualitatively, whereby the course of the curve referenced ID corresponds to that which would occur without the counter-movement of the cable core. In practice, however, a saw-toothed curve referenced RE that proceeds somewhat flatter occurs because of the counter-movement that increases with the increasing rotational angle.

If desired, the actual course of the rotational angle dependent on the time can be largely approximated to the ideal curve course ID with additional measures.

In a method of the species initially cited, this object is inventively achieved in that the rotation around the longitudinal axis within the twister is undertaken with changing speeds and in that the speed discontinuity is kept constant for every change of rotational direction.

Figure 5:
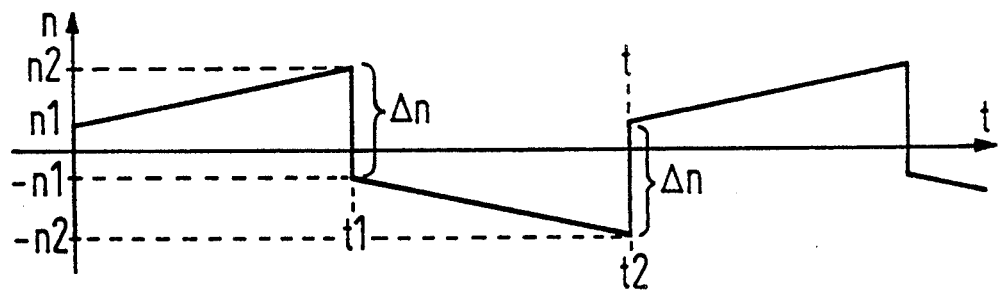
FIG. 5 is a graph illustrating a modified speed curve dependent on time.

The curve of the speed n required for this is shown in FIG. 5, dependent on the time t in an exemplary embodiment for more detailed explanation. In contrast to FIG. 1, the speed within a twister is no longer constant but changes between a lowest value n1 and a highest value n2 so that $(n1+n2)/2+n0$ occurs as a mean value. In FIG. 5, the speed within the first rotational sense initially rises from n1 to n2, wherein the subsequent speed discontinuity is undertaken so that the speed difference $\Delta n$ remains constant, this being achieved in that the next rotational sense begins at $-n1$ and ends at $-n2$, etc. With respect to the rotational angle, this results wherein that, in point in time t of the first directional sense reversal, a type of "over-turning" or of an "over-torsion" of the cable element is carried out, due to the speeds n2 increased over n0, as a result whereof the actual curve RE of FIG. 4 is displaced in the direction toward the ideal curve ID, i.e., in the direction of the ideal curve.

Generally valid for the speed discontinuity $\Delta n$ is the relationship $\Delta n = |n1| + |n2|$, whereby it is assumed that the variation of speed occurs in the same direction within every rotational sense. It is assumed in the present example that a discontinuous increase of the speed occurs.

The change of speed within a rotational sense must be undertaken so that the difference between the rotational angle $\phi i$ (ideal) and $\phi r$ (real) of FIG. 4 is eliminated insofar as possible. An exponential curve is, in fact, actually involved, but this may be assumed to be linear in a good approximation in the region under consideration.

Figure 6:
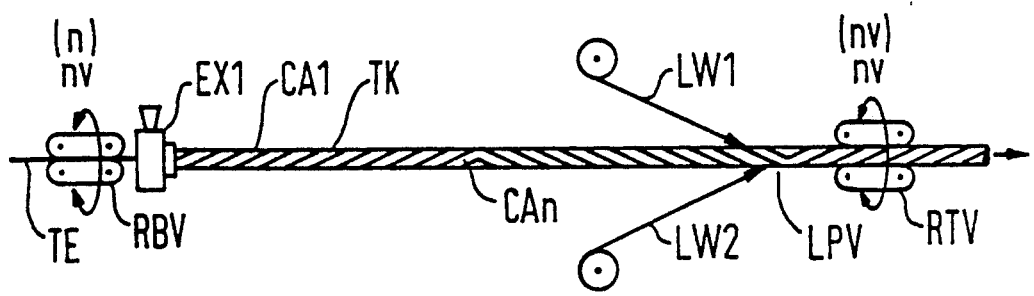
FIG. 6 is a diagrammatic presentation of an apparatus for achieving the speed behavior illustrated in FIG. 5.

In FIG. 6, a schematic illustration for explaining the apparatus with which the method of the invention can be implemented is shown. The tensile core element TE enters into a first twister RBV that is rotated around its longitudinal axis by a drive motor (not shown in detail here) and thereby twists the tensile core TE. The extruder EX1 is arranged immediately thereafter, the supporting member TK provided with the chambers or grooves CA1-CAn is manufactured by this extruder El. The light waveguides LW1-LWn are supplied at the insertion point LPV, whereby only the two light waveguides LW1 and LW2 are schematically shown. A torsion in the same sense and synchronous with the twisting with the twister RBV is undertaken in a second twister RTV following immediately thereafter. The two twisters RBV and RTV are, thus, synchronously operated with the regularity of the speed shown in FIG. 5 and this is indicated by the speed, particularly, nv. The compensation of the rotational angle errors indicated in conjunction with FIGS. 4 and 5 will then occur.

In the simplest case, the variation of the speed occurs according to the linear regularity, as shown in FIG. 5. However, it is also possible to provide non-linear variations of the speed, whereby it must always be assumed that the speed discontinuity $\Delta n$ is retained in terms of size.

It is also possible to proceed such that one of the twisters, for example the twister RBV, is operated with the speed curve n according to FIG. 3, as indicated in parenthesis, and is, thus, switched between the speeds n0 and $-n0$, whereas the second twister RVT undertakes the torsion with the speeds nv corresponding to FIG. 5, as indicated by the parenthesis. The latter is possible because the rotational angle error according to FIG. 4 plays a part, at most, in the region of the insertion point LPV for the light waveguides so that it is usually adequate to operate only the neighboring twister with the compensating curve n of FIG. 5, whereby $\Sigma \Delta n$ becomes greater for the second twister RTV than for the first twister RVB.

The twister, which operates with variable speeds, for example RTV in the present example, should comprise a longer, neighboring straight-line storing path and should have a greater distance from the respective take-up or haul-off drum.

In this case, a certain torsion also occurs between the two twisters RBV and RTV and this can be employed by subsequent relaxation of the elements (spring back of the supporting member into a torsion-free position) to offer excess lengths of the light waveguides. To this end, it is practical to arrange the second twister RTV optimally directly behind the insertion point LW for the light waveguides LW1 and LW2 and to allow this twister RTV to attack the unprotected supporting member TK. For example, the supporting member TK has not yet provided with the outside cladding. The application of the outside cladding then occurs with the following extruder, as shown in FIG. 1.

Although various minor modifications may be suggested by those versed in the art, it should be understood that I wish to embody within the scope of the patent granted hereon all such modifications as reasonably and properly come within the scope of my contribution to the art.

I claim:

1. In a method for manufacturing an optical cable which includes providing a tensile member, extruding a supporting member on said tensile member, said supporting member having chambers proceeding helically with a direction which direction is reversed at reversing points having a definite spacing therebetween, and subsequently inserting light waveguides into the chambers at an insertion point, the improvements comprising synchronously rotating the tensile element around a longitudinal axis prior to the step of extruding the supporting member and synchronously rotating the supporting member after the insertion of the light waveguides, said step of inserting the light waveguides inserting the light waveguides at a distance from the output of the extruder, which is an even number of spacings between the reversing points of the supporting member so that the direction of the chambers in the extruder and at the insertion point, respectively, proceed in the same direction and, thus, proceed synchronously.

2. In a method according to claim 1, wherein the step of inserting the light waveguides inserts the light waveguides by spatially stationary guide tubes that are pivotable only transversely relative to their longitudinal axis.

3. In a method according to claim 1, which includes cooling the supporting member after the step of extruding and prior to the step of inserting the light waveguides.

4. In a method according to claim 1, wherein the direction reversal and the course of the chambers is undertaken after twisting through 2-8 turns.

5. In a method according to claim 1, wherein the spacing between reversing points in a manufactured specimen is retained chronologically unaltered.

6. In a method according to claim 1, wherein the step of rotating around the longitudinal axis with rotational sense is undertaken with changing speeds and in that the speed discontinuity is kept constant for every rotational sense change.

7. In a method according to claim 6, wherein the step of rotating is accomplished by providing a twister at each location, and said twisters are synchronously varied in their speeds of twisting.

8. In a method according to claim 6, wherein the speed is varied in the same fashion for each rotational sense.

9. In a method according to claim 8, wherein the speed increases within every rotational sense, preferably increasing approximately linearly.

10. In a method according to claim 6, wherein the step of rotating is accomplished by a twister at each location and only one of the twisters has a speed varied within a rotational sense, whereas the other twister is operated with a constant speed within a respective rotational sense.

11. In a method according to claim 10, wherein the twister having the variable speed is arranged as close as possible to the insertion point.

12. An apparatus for providing a supporting member on a tensile member and inserting waveguides in helically extending chambers on said supporting member, said apparatus comprising a first twister being arranged for twisting a tensile element, an extruder following the first twister for applying a supporting member having longitudinally extending chambers on said tensile element, means for inserting light waveguides in each of the chambers at an insertion point following said extruder, and a second twister being arranged to follow said means for inserting light waveguides, said means for inserting light waveguides being positioned at a distance equal to an even-numbered multiple of spacings between reversing points of the chambers of the supporting member from said extruder.

13. An apparatus according to claim 12, wherein the distance between the extruder and the insertion point for the means for inserting the light waveguides is selected to equal twice the spacing between reversing points.

14. An apparatus according to claim 12, wherein the means for insertion is fashioned spatially stationary.

15. An apparatus according to claim 12, wherein a cooling means for the supporting member is provided following the extruder and before the insertion point of the means for inserting.

16. An apparatus according to claim 12, wherein the means for inserting include guide tubes that serves as a tangential introduction for the waveguides into the chambers.

17. An apparatus according to claim 16, wherein the guide tubes are mounted for pivotable movement transversely relative to their longitudinal axes and, thus, follow the course of the chambers.

* * * * *